March 1, 1932.  J. G. COLLINS  1,847,382

TRUCK WHEEL DOLLY

Filed Sept. 21, 1928  2 Sheets-Sheet 1

INVENTOR
James G. Collins
BY Chappell & Earl
ATTORNEYS

Patented Mar. 1, 1932

1,847,382

UNITED STATES PATENT OFFICE

JAMES G. COLLINS, OF KALAMAZOO, MICHIGAN, ASSIGNOR TO ATLAS PRESS COMPANY, OF KALAMAZOO, MICHIGAN

TRUCK WHEEL DOLLY

Application filed September 21, 1928. Serial No. 307,368.

The main objects of this invention are:

First, to provide an improved truck wheel dolly that is simple in operation and automatically engages any size wheel to remove it from the axle.

Second, to provide such a dolly that is available generally as for handling automobile transmission units and rear axles.

Objects pertaining to details and economies of construction and operation will definitely appear from the description to follow.

A dolly embodying my invention is illustrated in the accompanying drawings, in which.

Figure 1:
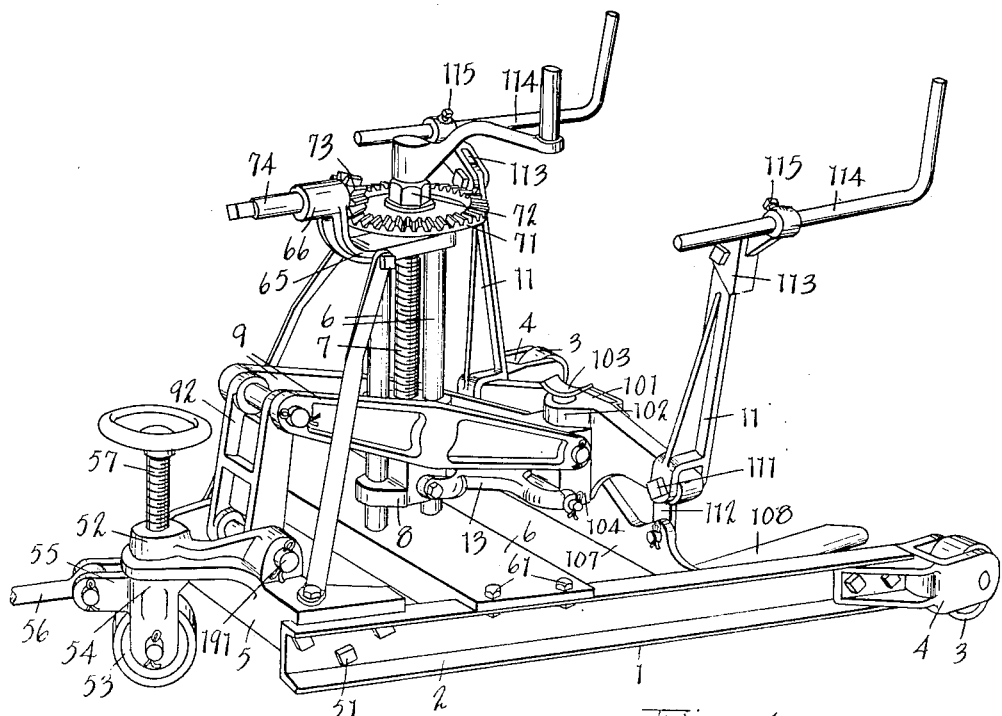
Fig. 1 is a perspective view of my improved truck dolly.
Figure 2:
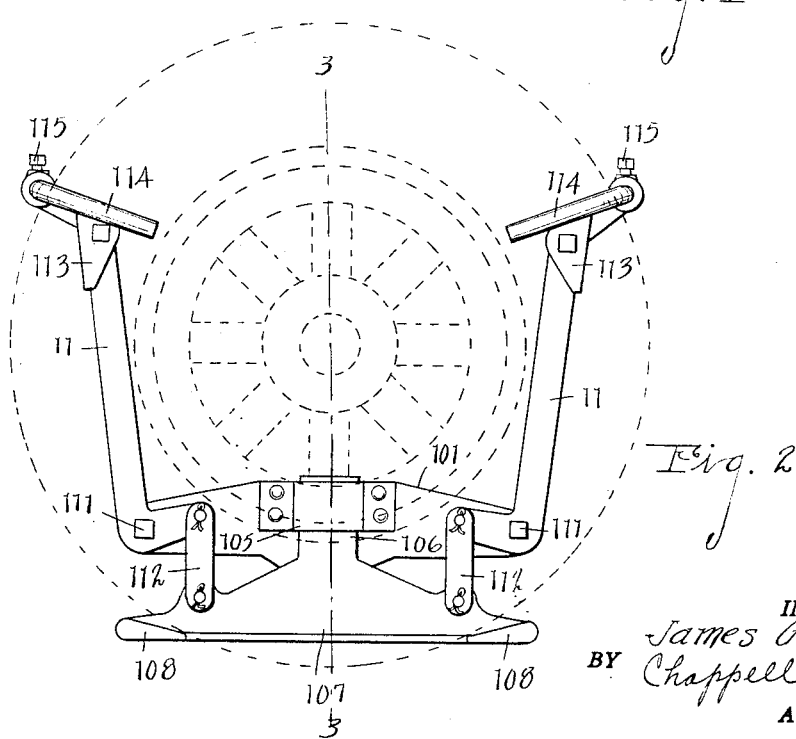
Fig. 2 is a front view of the wheel carrying cradle, a truck wheel being shown by dotted lines.
Figure 3:
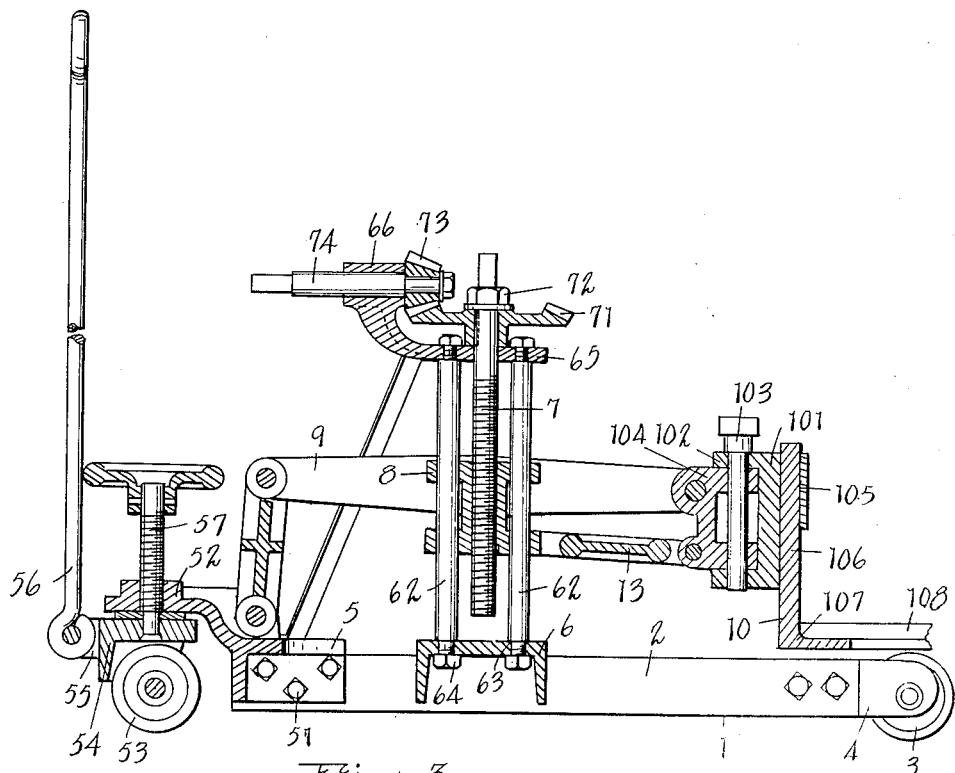
Fig. 3 is a longitudinal central sectional elevation view on line 3—3 of Fig. 2, the wheel carrying cradle being shown in an elevated position.
Figure 4:
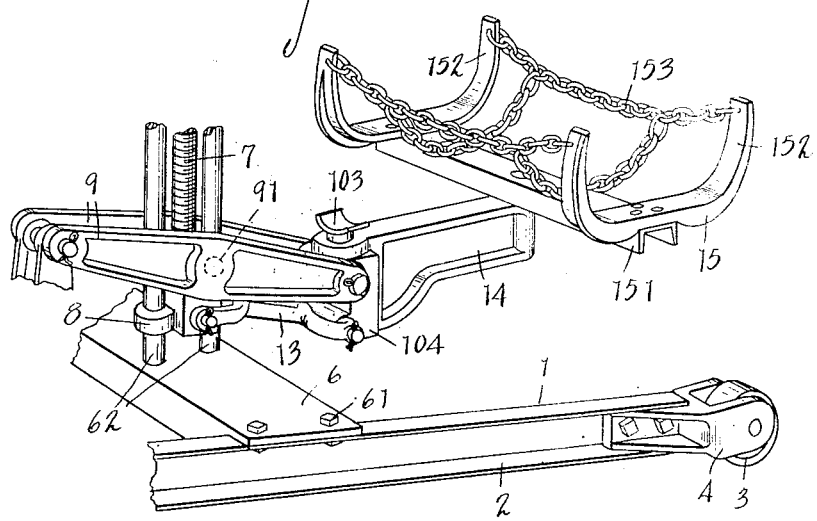
Fig. 4 is a perspective view of a portion of the dolly showing an adaptation with a transmission carrying cradle.

The parts will be identified by their numerals of reference which are the same in all the views.

1 is the base of triangular form made of side channel bars 2 and with forwardly extending base side arms. 3 is the roller in support 4 at the forward end of each arm. 5 is a cross beam or block of the frame to which side channel bars 2 are secured by bolts 51.

52 is a rearwardly extending arm from said beam or block 5 and is supported on the caster 53.

The caster head 54 is provided with lugs 55 for the tongue-like handle 56 by which the dolly is pulled or pushed about. The caster head 54 is pivoted to the lower end of vertical hand screw 57 which is threaded through the outer end of arm 52 and enables the adjustment of the elevation of the rear of the dolly and its consequent incline. 6 is the jack supporting cross beam bolted to the frame at 61 for the elevating jack. 62 is a pair of upright guide posts each shouldered at 63 and secured to the beam 6 by nuts 64. 65 is the jack frame head carried by the guide posts 62. 7 is the jack screw, squared at its upper end for a crank, disposed between the guides and journalled in said frame head 65. 71 is the driven gear secured by nut 72 to said jack screw 7 and its hub bears and thrusts on the top of the frame head 65.

The gear 71 is driven by pinion 73 which is carried on crank shaft 74 journalled in bracket 66 which is integral with head 65. This is used in lifting the load. To operate the screw at a greater speed, in lowering for instance, the crank 75 is placed on the end of the screw 7 as seen in Fig. 1.

8 is the elevating slide or cross head sliding on the guide posts 62, and centrally bored and threaded for jack screw 7 by which it is actuated and moved up and down. 9 is a pair of elevating levers pivotally secured or fulcrumed at one end by the link 92 to the base block 5. The levers are connected to the elevating slide 8 at pivots 91. 10 is the wheel carrying cradle carried by said levers 9. It comprises the pivoted cross head 101 with ears 102 turning on pivot pin 103 on connection bracket 104 carried by levers 9.

In a central vertical way 105 on head 101 is the shank 106 extending downwardly into cross bar 107 having forwardly projecting side arms 108 for engagement under a truck wheel. 11, 11 are pivoted side arms like bent levers symmetrical and opposed carried on fulcrum pivots 111 on the ends of cross head 101. The short arms of levers 11 are horizontally disposed and connected by links 112 to the ends of cross bar 107. 113 are brackets at the top ends of the long arms of levers 11. 114 are adjustable engaging hook arms the shanks of which are held adjustably in brackets 113 by screws 115 and engage and support a wheel by automatically engaging the same when the wheel is picked up.

The pin 103 is provided with a head so that the dolly is conveniently used as a jack when the cradle is removed. 13 is a parallel link connected to the bracket 104 and to the elevating slide 8 to maintain parallel relation and action of the levers.

With the parts thus arranged, a truck wheel is quickly removed and conveyed away by the operation which may be described as follows:

The dolly is pushed to a position so that the arms 108 are directly beneath the wheel to be removed. The tilt is adjusted by screw 57. The turning of the screw 7 elevates the slide 8 which lifts the wheel cradle 10 until the arms 108 contact with the wheel. By continuing to raise the bracket the links 112 operate the side lever arms 11 which carry the engaging hook arms 114 which are swung into a position to engage the wheel so that when the dolly is pulled away from the truck the ends pull the wheel and also prevent the wheel from tipping over as it is conveyed away.

In the modification or adaptation for the transmission gear, the bracket 14 is substituted for the head 101 and swings on pin 103. The transmission carrying cradle 15 consists of a cross member 151 having a pair of U-shaped arms 152 secured thereto and a plurality of chains 153 for carrying the transmission housing.

The structure of my improved dolly is capable of great variations in detail without departing from my invention. The cradle part may be omitted and the structure used as a jack. The particular cradle is capable of use in other relations. The adjusting feature of the caster may be omitted without other change and a fairly satisfactory structure remain.

I desire, however, to claim the invention in the particular form shown and also broadly as pointed out in the appended claims.

Having thus described my invention, what I claim as new and desire to secure by Letters Patent, is:

1. In a dolly structure, the combination of a base with means for transporting the same, upright guiding posts carried by said base, a jack frame head at the top of said guide posts, a jack screw journalled in said head with upwardly projecting crank end, a beveled driven gear on said jack screw with thrust bearing, a driving pinion on a crank shaft for said gear, a slide on said guiding post and screw threaded for said jack screw, a pair of forwardly projecting levers pivoted to the said slide, fulcrum links for the rear end of said levers connecting to said base, a pivoted connecting bracket on the front of said levers, a link parallel to said levers from said bracket to said slide to maintain the pivoted connecting bracket upright, a wheel cradle supported on a vertical pivot bolt in said connecting bracket comprising a cross head with vertical central slideway thereon, a wheel support with an upward slide extension in said slideway having cross arms at the bottom and forwardly projecting lifting arms therefrom to engage the wheel, angle levers pivoted to each side of the said pivoted cross head with inwardly projecting short arms and upwardly and outwardly projecting long arms, link connections from the said short arms to the said wheel support, brackets at the upper ends of said long arms, and adjustable hooked arms carried by said brackets to engage the opposite sides of the wheel to be lifted automatically when picked up by the dolly to retain the said wheel when removed and maintain it in upright position, as specified.

2. In a dolly structure, the combination of a base with means for transporting the same, upright guiding posts carried by said base, a jack frame head at the top of said guide posts, a jack screw journalled in said head with upwardly projecting crank end, a beveled driven gear on said jack screw with thrust bearing, a driving pinion on a suitable crank shaft for said gear, a slide on said guiding post and screw threaded for said jack screw, a pair of forwardly projecting levers pivoted to the said slide, fulcrum links for the rear end of said levers connecting to said base, a pivoted connecting bracket on the front of said levers, and a link parallel to said levers from said bracket to said slide to maintain the pivoted connecting bracket upright, and carrying means on said bracket, as specified.

3. In a dolly structure, the combination of a base with means for transporting the same, a jack screw structure having a vertically movable slide, a pair of forwardly projecting levers pivoted to the said slide, fulcrum links for the rear end of said levers connecting to said base, a pivoted connecting bracket on the front of said levers, a link parallel to said levers from said bracket to said slide to maintain the pivoted connecting bracket upright, a wheel cradle supported on a vertical pivot bolt in said connecting bracket comprising a cross head with a vertical central slideway therein, a wheel support with an upward slide extension in said slideway having cross arms at the bottom and forwardly projecting lifting arms therefrom to engage the wheel, angle levers pivoted to each side of the said pivoted cross head with inwardly projecting short arms and upwardly and outwardly projecting long arms, link connections from the said short arms to the said wheel support, brackets at the upper ends of said long arms, and adjustable hooked arms carried by said brackets to engage the opposite sides of the wheel to be lifted automatically when picked up by the dolly to retain the said wheel when removed and maintain it in upright position, as specified.

4. In a dolly structure, the combination of a base with means for transporting the same, a jack screw structure having a vertically movable slide, a pair of forwardly projecting levers pivoted to the said slide, fulcrum links for the rear end of said levers connecting to said base, a pivoted connecting bracket on the front of said levers, a link parallel to said levers from said bracket to said slide to maintain the pivoted connecting bracket upright, and carrying means on said bracket, as specified.

5. In a dolly structure, an elevating means comprising the base, upright guiding posts carried by said base, a jack frame head at the top of said guide posts, a jack screw journalled in said head with upwardly projecting crank end, a beveled driven gear on said jack screw having a thrust bearing, a driving pinion on a crank shaft for said gear, a slide on said guiding post and screw threaded for said jack screw, a pair of forwardly projecting levers pivoted to the said slide, fulcrum links for the rear end of said levers connecting to said base, a pivoted connecting bracket on the front of said levers, and a link parallel to said levers and connecting said bracket to said slide to maintain the pivoted connecting bracket upright, as specified.

6. In a dolly structure, elevating means with a pivoted bracket, a wheel cradle supported on a vertical pivot bolt in said connecting bracket comprising a cross head with a vertical central slideway therein, a wheel support with an upward slide extension in said slideway having cross arms at the bottom and lifting arms forwardly projecting therefrom to engage the wheel, angle levers pivoted to each side of the said pivoted cross head with inwardly projecting short arms and upwardly and outwardly projecting long arms, link connections from the said short arms to the said wheel support, brackets at the upper ends of said long arms, and adjustable hooked arms carried by said brackets to engage the opposite sides of the wheel to be lifted automatically when picked up by the dolly to retain the said wheel when removed and maintain it in upright position, as specified.

In witness whereof I have hereunto set my hand.

JAMES G. COLLINS.